United States Patent
Obermann

[19]

[11] Patent Number: 6,046,405
[45] Date of Patent: *Apr. 4, 2000

[54] POP-UP ELECTRICAL RECEPTACLE ASSEMBLY

[76] Inventor: Richard Obermann, W151 S9940 Thode Dr., Muskego, Wis. 53150

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,990

[22] Filed: Jul. 25, 1997

Related U.S. Application Data

[60] Provisional application No. 60/022,404, Jul. 30, 1996.

[51] Int. Cl.⁷ ..................................................... H01H 9/02
[52] U.S. Cl. ..................... 174/57; 174/17 CT; 174/55; 174/66; 220/241; 220/3.8
[58] Field of Search .................................. 174/53, 57, 55, 174/66, 67, 17 CT; 220/3.3, 3.7, 3.8, 241, 242; 439/131, 142

[56] References Cited

U.S. PATENT DOCUMENTS

| | | | |
|---|---|---|---|
| 2,196,842 | 4/1940 | Strazzabosco | 173/330 |
| 3,131,512 | 5/1964 | MacLeod, Jr. et al. | 220/3.3 X |
| 3,594,693 | 7/1971 | Robbins | 339/44 R |
| 3,972,579 | 8/1976 | Kohaut | 439/131 |
| 3,992,070 | 11/1976 | Dunn et al. | 439/131 X |
| 4,223,796 | 9/1980 | Silver | 220/3.8 |
| 4,747,788 | 5/1988 | Byrne | 174/57 X |
| 4,984,982 | 1/1991 | Brownlie et al. | 174/53 X |
| 5,023,396 | 6/1991 | Bartee et al. | 174/48 |
| 5,122,069 | 6/1992 | Brownlie et al. | 174/53 X |
| 5,230,552 | 7/1993 | Schipper et al. | 439/131 X |
| 5,342,993 | 8/1994 | Siems | 174/48 |
| 5,575,668 | 11/1996 | Timmerman | 439/131 |

FOREIGN PATENT DOCUMENTS

| | | | |
|---|---|---|---|
| 568315 | 3/1993 | Japan | 174/53 X |
| 591623 | 4/1993 | Japan | 174/53 X |
| 6276649 | 9/1994 | Japan | 174/53 X |

*Primary Examiner*—Dean A. Reichard
*Attorney, Agent, or Firm*—Joseph S. Heino

[57] ABSTRACT

A pop-up electrical outlet assembly has a flush surface mounted bezel or flange with an opening defined in it. To one side of the bezel opening is a hinged cover. Located beneath the cover is an electrical box. The electrical box is mounted to the same side of the bezel opening with a supplemental hinge. The hinge allows the electrical box to pop-up when the cover is lifted from its closed position. The receptacle is held in position with a spring catch. The electrical box is effectively isolated from any water which may be splashed up against the bezel both during use of the receptacle and when it is not in use.

11 Claims, 1 Drawing Sheet

POP-UP ELECTRICAL RECEPTACLE ASSEMBLY

This application claims the benefit of U.S. Provisional Application Ser. No. 60/022,404, filed Jul. 30, 1996.

FIELD OF THE INVENTION

This invention relates generally to electrical outlets and receptacles, including those which are usually mounted in walls and other vertical surfaces and are functionally adapted to receive electrical plugs to supply electric current to various electrical appliances and devices. More particularly, it relates to an electrical outlet and receptacle assembly which can be opened from and retracted to a position below a horizontal surface to hide the receptacle when such is desired or required.

BACKGROUND OF THE INVENTION

It has long been recognized that water and other liquids can easily enter electrical outlets and receptacles and cause electrical shorts. This is particularly true where, for example, an electrical outlet is mounted to a horizontal surface. For that reason, such outlets, when placed for kitchen use, are located either vertically above or below the horizontal surface of a countertop. Any water or liquid situated on that horizontal surface would be incapable of penetrating the outlet located above the horizontal surface. In the case of a kitchen island or peninsula where there is no physical ability to place such an outlet or receptacle above the countertop, simply because there is no wall to locate in into, the only option is to locate the outlet or receptacle below the horizontal countertop. The lip of the horizontal countertop can provide an effective barrier against any water or liquid running off of the horizontal countertop and down into the outlet located below that horizontal surface. In this inventor's experience, however, such conventional placement of the electrical outlets and receptacles limits the ease of use of electrical appliances and devices in the kitchen. Such placement can create an obstruction with drawers and the like. It can also result in a violation of the National Electrical Code, in particular Article 210, Section 52, subsection C, items 2 and 3 (1996) thereof. The cords to the electrical appliances and devices can also hang over the edge of the countertop where passers by can snag them and even pull the appliances down from the countertop.

SUMMARY OF THE INVENTION

It is, therefore, a principal object of this invention to provide a new, useful and uncomplicated assembly which consists of a recessable electrical outlet and receptacle which can be mounted into the top horizontal surface of a countertop. It is a further object of this invention to provide such an apparatus which requires only a minimal number of elements and which requires only a minimal number of steps to utilize. It is yet another object of this invention to provide such an apparatus which can be safely used in an environment where water or other liquids may, from time to time, be exposed to it and which is in full compliance with the National Electrical Code.

The present invention has obtained these objects. It provides for a pop-up electrical outlet assembly which has a flush surface mounted bezel or flange with an opening defined in it. To one side of the bezel opening is a hinged cover. Located beneath and mounted to the underside of the cover is an electrical box. This configuration allows the electrical box to pop-up when the cover is lifted from its closed position. The receptacle is held in position with a spring catch. The electrical box is effectively isolated from any water which may be splashed up against the bezel both during use of the receptacle and when it is not in use. The foregoing and other features of the device of the present invention will be further apparent from the description which follows.

DETAILED DESCRIPTION

Figure 1:
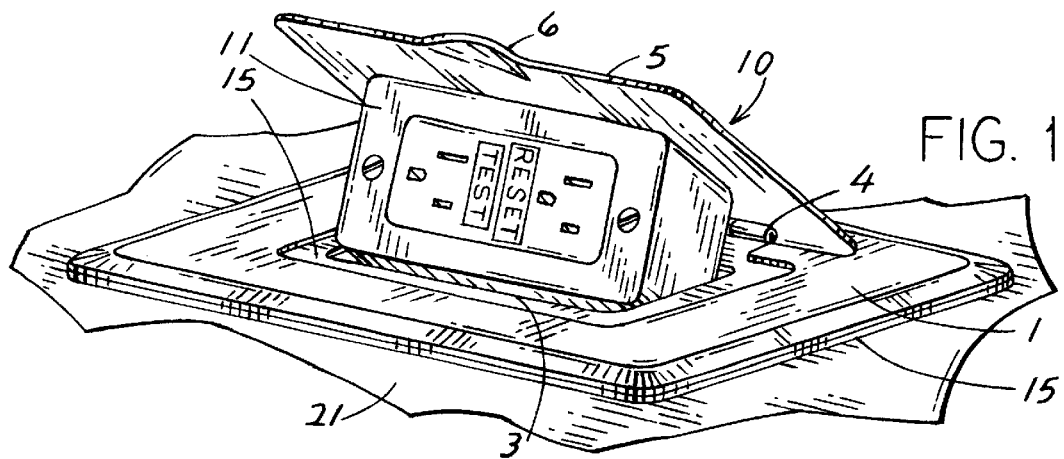
FIG. 1 is a front perspective view of an electrical receptacle utilizing the device of the present invention.

Referring now to the drawings in detail, FIG. 1 shows an electrical receptacle assembly, generally identified 10, constructed in accordance with the present invention. The assembly 10 includes a bezel 1 which is situated atop a slightly smaller sized hole (not shown) defined within the surface of a countertop 21. The outer edge of the bezel 1 may be tapered slightly downwardly toward the surface of the countertop 21. Situated between the bezel 1 and the countertop 21 is a gasket 15. The gasket 15 can be constructed of any number of commercially available rubber or synthetic materials.

Figure 2:
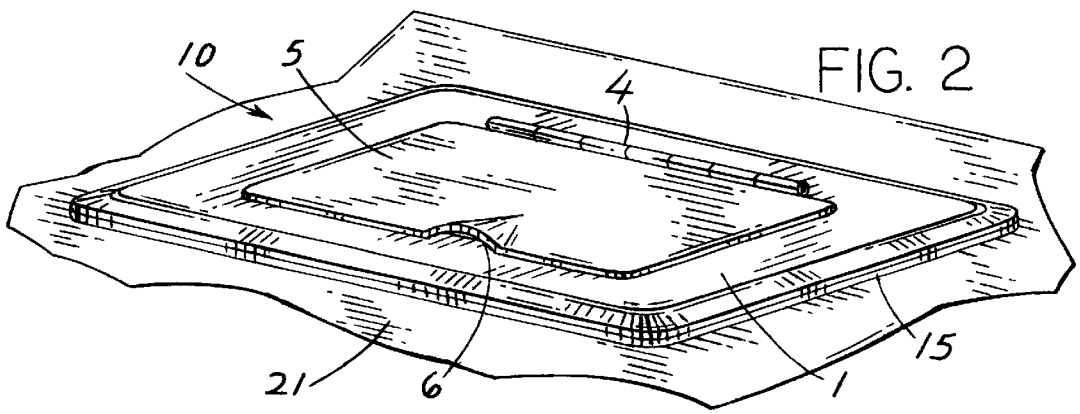
FIG. 2 is a front perspective view of the receptacle shown in FIG. 1 and showing the cover closed.

Situated within the bezel 1 is a bezel opening 3. To one side of the bezel opening 3 is a hinge 4 which is also attached to a bezel cover 5. In the closed position, the assembly 10 creates a rather unassuming structure. See FIG. 2. In fact, the bezel 1 and the bezel cover 5 may be color or material coordinated to match the countertop 21 with which the assembly 10 is to be utilized.

It is also to be understood that the bezel 1 and bezel cover 5 may be constructed from any number of commercially available materials including plastic, metal and even stainless steel.

The bezel cover 5 is lifted from the bezel 1 by utilizing the cover tab 6 which is located to the side of the bezel cover 5 opposite the hinge 4. In the open position, that is with the bezel cover 5 lifted upwardly and fully opened up, the receptacle 11 is exposed for use.

In the preferred embodiment, the receptacle 11 is directly connected to the bezel cover 5. In this configuration, the receptacle 11 is completely isolated from the edges of the opening 3 defined within the bezel 1.

Figure 3:
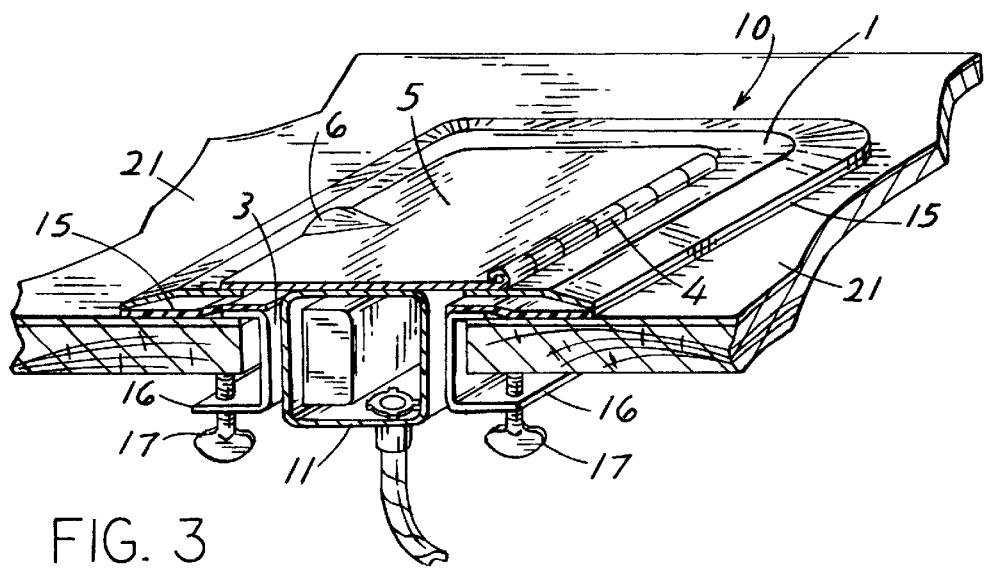
FIG. 3 is another perspective view of the receptacle shown in FIGS. 1 and 2 but showing a cut-away view of the receptacle.

The assembly 10 is maintained in the open position by use of a spring catch (not shown) also located to one side of the receptacle 11. See FIG. 3. The assembly 10 is attached to the countertop 21 by using attachment brackets 16 and attachment screws 17. See FIG. 3.

The attachment means can take many different forms, the variety of which is not intended to serve as any limitation to the device.

From the foregoing detailed description of the illustrative embodiment of the invention set forth herein, it will be apparent that there has been provided a new, useful and uncomplicated recessable electrical outlet and receptacle which can be mounted into the top horizontal surface of a countertop which requires only a minimal number of elements, which requires only a minimal number of steps to utilize and which can be safely used in an environment where water or other liquids may, from time to time be exposed to it.

What is claimed is:

1. An electrical outlet assembly for use in a generally horizontal surface, such surface being one which is exposed from time to time to spilled fluids, liquids and the like, comprising a substantially flat base member, said base member overlying a a portion of said horizontal surface in a parallel planar fashion and said base member having a substantially flat top surface, an opening defined within said base member, said opening having a generally rectangular shape and further having a perimeter defined about said opening, a substantially flat cover member for overlaying and covering said base member opening, said cover member having at least one edge and further having a top surface and a bottom surface, means for hingedly attaching said cover member edge to said base member, said attachment means being functionally adapted to enable the cover member to be movable from a closed position to an open position in relation to said base member opening, an electrical box, said electrical box having a generally flat top surface and four generally flat side surfaces, one such side surface including a plurality of electrical plug receptacles within it, said electrical box being dimensioned so as to be slightly smaller than the dimensions of the rectangular base member opening such that said electrical box can pass through said opening, means for raising a portion of said electrical box up and through said base member opening when the cover member is raised to its open position, said box raising means including a hinge which is attached to said cover member edge and to said base member at a point on the top surface of said flat base member away from the perimeter of the opening defined within said base member and further including means for fastening the top surface of said electrical box directly to and immediately adjacent the bottom surface of said cover member, and spill isolating means for preventing fluid and liquid spills from washing onto said electrical box, said spill isolating means including a gap defined between all of the sides of the electrical box and said base member opening.

2. The electrical outlet assembly of claim 1 wherein said base member comprises a bezel which functions as a part of said spill isolating means.

3. The electrical outlet assembly of claim 2 wherein said cover member comprises a bezel cover.

4. An electrical outlet assembly for use in a generally horizontal surface, such surface being one which is exposed from time to time to spilled fluids, liquids and the like, comprising a substantially flat bezel member, said bezel member overlying a portion of said horizontal surface in a parallel planar fashion and said bezel member having a top surface, an opening defined within said bezel member, said opening having a perimeter defined about said opening, a substantially flat bezel cover member, said bezel cover member being functionally adapted to overlay said bezel member opening and including at least one cover member edge, means for hingedly attaching said bezel cover member to said bezel member, said attachment means being functionally adapted to enable the bezel cover member to be movable from a closed position to an open position and including a hinge which is attached to said cover member edge and to said bezel member at a point on the top surface of said flat bezel member away from the perimeter of the opening defined within said bezel member, an electrical box, means for raising a portion of said electrical box through said bezel member opening when the bezel cover member is raised to its open position, and spill isolating means for preventing fluid and liquid spills from washing into and around said electrical box, said spill isolating means including a gap defined between said electrical box and said bezel member opening.

5. The electrical outlet assembly of claim 4 wherein said bezel member opening comprises a generally rectangular shaped opening.

6. The electrical outlet assembly of claim 5 wherein said bezel cover member comprises a generally rectangular-shaped cover having a top surface and a bottom surface, said bezel cover member being dimensioned slightly larger than the opening defined within the bezel member opening.

7. The electrical outlet assembly of claim 6 wherein said electrical box is dimensioned such that it may pass through said bezel opening.

8. The electrical outlet assembly of claim 7 wherein said electrical box raising means comprises mounting said electrical box to and directly beneath said bezel cover member.

9. An electrical outlet assembly for use in a generally horizontal surface, such surface being one which is exposed from time to spilled fluids, liquids and the like, comprising a first assembly member, said first assembly member including a generally flat top surface and having a generally rectangular opening defined in it, said opening having a perimeter defined about it, a second assembly member, said second assembly member comprising a generally flat and rectangular-shaped top cover having four edges, a top surface and a bottom surface, said second assembly member being functionally adapted to overlay the generally rectangular opening defined within said first assembly member, means for raising the top cover of said second assembly member from said first assembly member, said raising means comprising a hinge which is attached to one edge of the top cover and to said first assembly member at a point on the top surface of said first assembly member away from the perimeter of the rectangular opening defined within the first assembly member, an electrical box, said box being mounted to and beneath said top cover, means for isolating the electrical box from said first assembly member, said isolating means including a gap defined between said electrical box and the opening of said first assembly member.

10. The electrical outlet assembly of claim 9 wherein said first assembly member comprises a bezel.

11. The electrical outlet assembly of claim 10 wherein said second assembly member comprises a bezel cover.

* * * * *